United States Patent [19]

Betts et al.

[11] Patent Number: 4,939,748
[45] Date of Patent: Jul. 3, 1990

[54] UNOBTRUSIVE SIGNATURE FOR MODULATED SIGNALS

[75] Inventors: William L. Betts, St. Petersburg; Kenneth Matinez, Pinellas Park, both of Fla.

[73] Assignee: Paradyne Corporation

[21] Appl. No.: 83,696

[22] Filed: Aug. 7, 1987

[51] Int. Cl.$^5$ .............................. H04L 5/16; H04L 7/04
[52] U.S. Cl. ........................................... 375/8; 375/111; 370/100.1
[58] Field of Search .................. 455/51, 295; 375/113, 375/8, 106, 110, 115, 111, 114; 370/100, 107, 100.1, 105.4

[56] References Cited

U.S. PATENT DOCUMENTS

| | | | |
|---|---|---|---|
| 3,546,384 | 12/1970 | Brigham | 375/113 |
| 3,767,855 | 10/1973 | Veno et al. | 375/113 |
| 3,955,141 | 5/1976 | Lyon et al. | 375/111 |
| 4,171,513 | 10/1979 | Otey et al. | 375/106 |
| 4,433,425 | 2/1984 | de Jaeger | 375/113 |
| 4,435,825 | 3/1984 | Tomooka | 375/113 |
| 4,472,817 | 9/1984 | Poklemba et al. | 375/113 |
| 4,479,258 | 10/1984 | Namiki | 455/295 |
| 4,494,240 | 1/1985 | Payton | 375/113 |
| 4,706,245 | 11/1987 | Suzuki | 375/113 |
| 4,736,388 | 4/1984 | Eguchi | 375/8 |

Primary Examiner—Reinhard J. Eisenzopf
Assistant Examiner—Curtis Kuntz

[57] ABSTRACT

A system for transmitting data signals over a communications channel comprises a transmitter modem having means for encoding data signals and a generator for superimposing a first signature signal on the encoded data and a receiver modem which superimposes a second signature signal on the received data. The second signature signal is identical to the first such that the signature signals cancel each other if the transmitter and receiver modems are in synchronism.

4 Claims, 2 Drawing Sheets

UNOBTRUSIVE SIGNATURE FOR MODULATED SIGNALS

This invention relates to U.S. Pat. No. 4,752,943 entitled "FREQUENCY OF OCCURENCE RETRAIN DECISION CIRCUIT", which has the same inventors and assignees on this application and is being filed simultaneously herewith.

BACKGROUND OF THE INVENTION

1. Field of the Invention

This invention relates to a system for transmitting data over a communication channel, the system comprising transmitter and receiver modem circuits with the receiver modem circuits having means for determining whether it is in synchronism with the signals being sent over the channel by the transmitter.

2. Description of the Prior Art

Prior art wireline modems have multiple configurations which can be selected to satisfy different network applications. In most cases, improper configuration selection will cause incompatibility between local and remote modems. The prior art modems have generally not had the ability to automatically detect incompatible configurations.

The aforementioned incompatibility can be due to incorrect bootstrapping of an input signal into the modem circuit or to channel impairments which cause the transmitter and receiver modem to fall out of synchronism.

OBJECTIVES AND SUMMARY OF THE INVENTION

A principal objective of the present invention is to provide a system for transmitting data over an analog communication channel wherein the system comprises transmitter and receiver modems and the receiver modem has means for detecting a lack of synchronization between it and the transmitter modem.

A further objective is to provide such a system in which a detectable but unobtrusive signature signal is superimposed on the modulated signal which is transmitted over the channel, and an equivalent signature signal is injected at the remote receiver modem before decoding such that, if the aforementioned signature signals cancel each other, the transmitter and receiver modems will be shown to be in synchronism.

Other objectives and advantages of the invention shall become apparent from the following description of the invention.

The objectives of the invention are achieved by providing a signature generator which has a permanent input from a multiplex synchronizer (MUX SYNC) which operates at a constant frequency and is used to frame data from a multiplexer. One of the aforementioned signals generated is provided in the transmitter modem and functions to deliver signals to a coordinate transformation module in the transmitter. The coordinate transformation module uses the input from the signature generator to operate on the real and imaginary components of signals representative of input data which has been encoded by a modem encoder. The transformed encoded signals are filtered, quadrature amplitude modulated, converted to analog form, and transmitted over a communications channel. The signals are received at the remote end of the communications channel, converted to digital form, demodulated, filtered, and equalized. The equalized signals are conveyed to a coordinate transformation module like that in a transmitter modem and are therein mixed with input from a second signature generator similar to that in the transmitter modem. The transformed signals are conveyed to a modem decoder, and the digital data is output therefrom. However, the modem decoder also includes means for detecting a loss of synchronism between the transmitter and receiver modems. These means for detecting loss of synchronism may comprise, but do not necessarily comprise, the means for detecting loss of synchronism shown in the aforementioned copending U.S. Pat. No. 4,752,943, which application has the same inventors and assignee as the present one and which is being filed simultaneously with the present application. The loss of detection means in the copending application which could be used in the modem decoder of the present invention includes means for producing an index representative of an inner or an outer point on the complex plane of the received signal constellation, an inner and outer point detector, and an up/down counter which is respectively incremented or decremented when inner or outer points are detected. The means for detecting synchronism also includes a comparator which issues a retrain command when the signal from the aforementioned counter equals a preselected signal which is constantly sent to the comparator by a threshold signal generator. The comparator and threshold signal generator have been assigned to a separate sync detector module in the receiver schematic for the present invention, although it is purely a matter of choice as to whether they are separate as indicated or included within the modem decoder module.

DETAILED DESCRIPTION OF THE INVENTION

Figure 1:
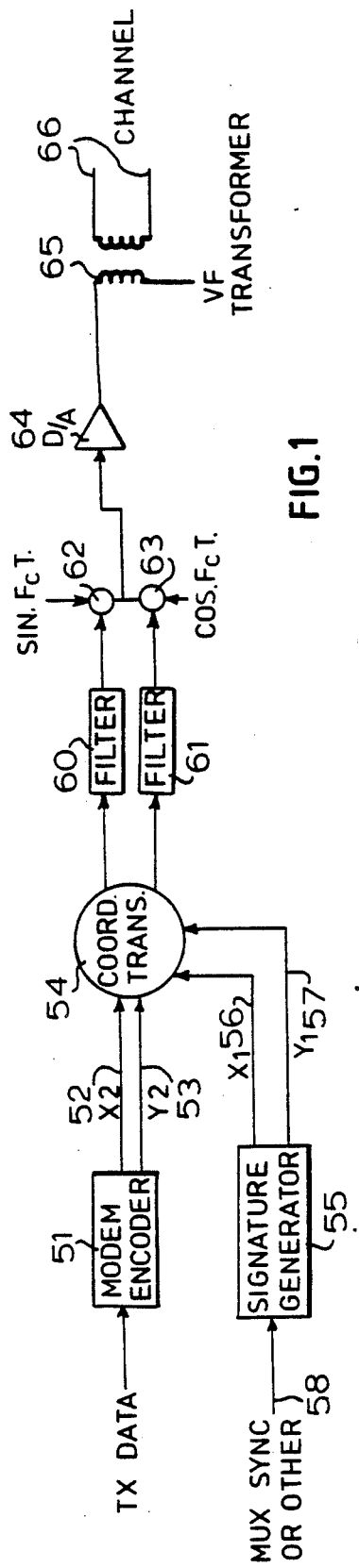
FIG. 1 is a schematic of the modem transmitter circuit of the present invention.

As shown in FIG. 1, the transmitter modem of the first invention comprises a modem encoder 51 which encodes digital data and outputs real and imaginary components $x_2$ and $y_2$ along conductors 52 and 53 to coordinate transformation module 54. Coordinate transformation module 54 also receives input $x_1$ and $y_1$ from signature generator 55 which was a constant input from multiplex synchronizer or other synchronizer 58. If the outputs from signature generator 55 along lines 56 and 57 to coordinate transformation module 54 are other than zero the module mixes the signals, and the $x_2$ and $y_2$ signals are transformed before they are outputted to filters 60 and 61. However, if the signals $x_1$ and $y_1$ are 0, the coordinate transformation module applies a factor of unity to the signals being input along lines 52 and 53 and thus the output of modem encoder remains unchanged as it reaches filter 60 and 61. The real and imaginary components of the signal are then respectively modulated by being combined with sine and cosine carrier waves in mixer modules 62 and 63. A combined modulated single signal is then conveyed to digital analog converter 64 which outputs an analog signal to VF transformer 65 for transmission on a channel.

Figure 2:
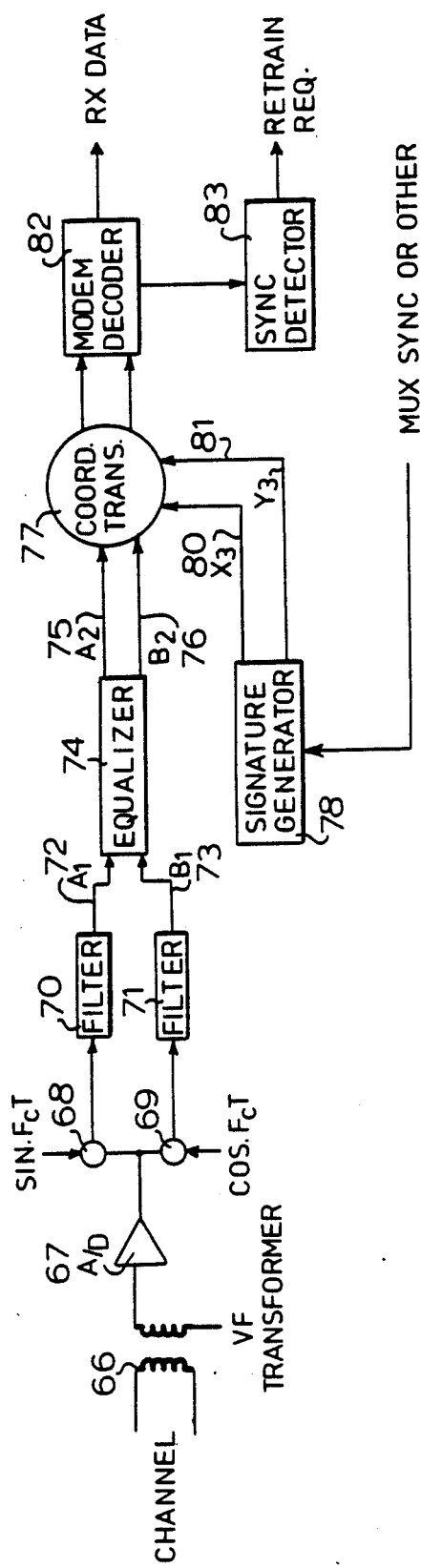
FIG. 2 is a schematic of the modem receiver circuit of the present invention.

As shown in FIG. 2, at the receiver modem at the remote end of the channel the signal passes through VF transformer 66 and analog to digital converter 67 and is then demodulated and split into real and imaginary components by demodulator module 68 and 69 which remove the aforementioned carrier waves from the signal. The real and imaginary components then respectively pass through filters 70 and 71, and are conveyed by conductors 72 and 73 to equalizer 74. The $A_2$ and $B_2$ outputs to the equalizer are then combined in coordinate transformation module 77, after being conveyed thereto on conductors 75 and 76, with signature generator 78's outputs $x_3$ and $y_3$ along respective conductors 80 and 81. Coordinate transformation module 77 and signature generator 78 are similar in structure and function to coordinate transformation module 54 and signature generator 55 previously described with regard to the transmitter modem. Like signature generator 55, signature generator 78 has a constant multiplex synchronization or other synchronization input.

The output from coordinate transformation module 77 is fed along two paths to modem decoder 82 which decodes the real and imaginary components of the data signal and outputs a single digital data signal.

Figure 3:
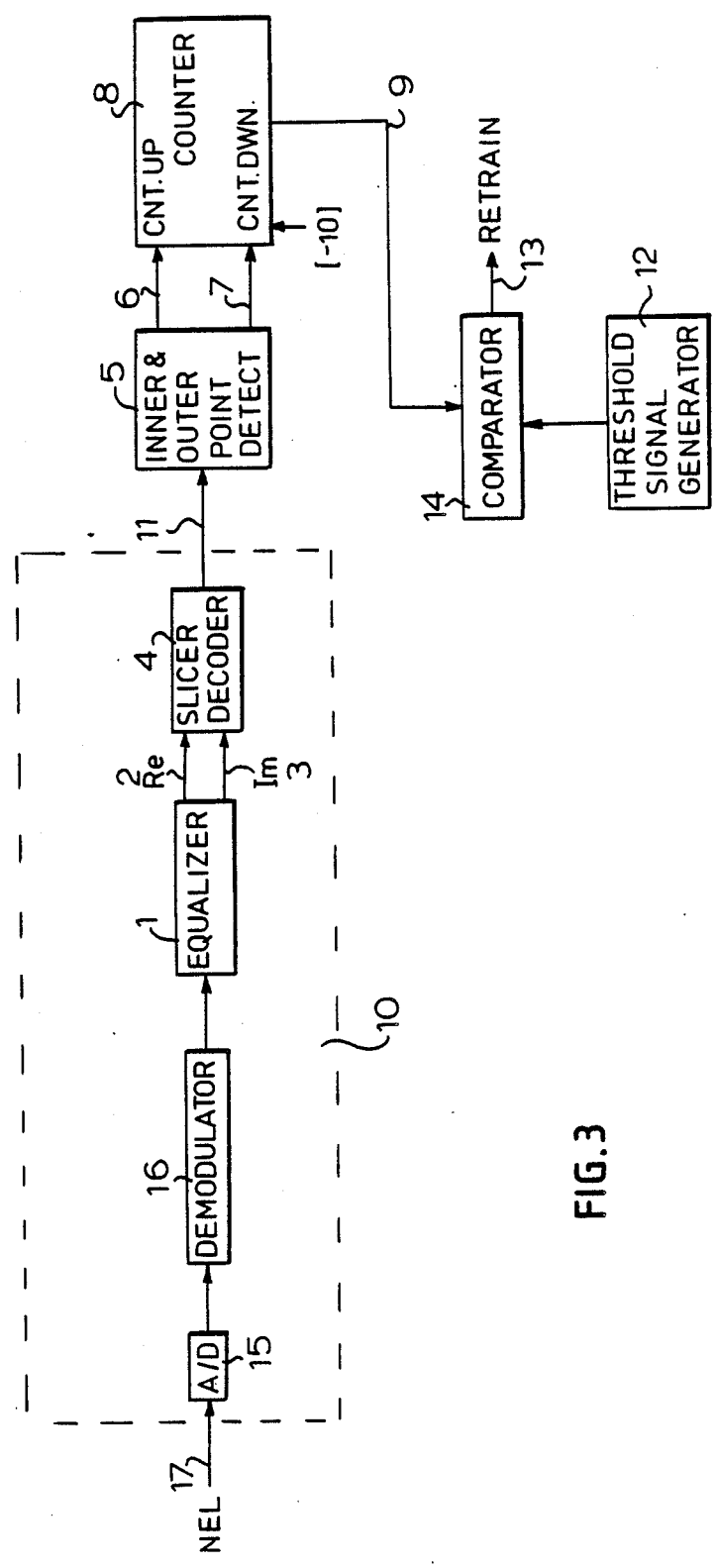
FIG. 3 is a schematic of a synchronization detection circuit, some elements of which can be used in one of the embodiments of the present invention.

An important function of the modem receiver is found in modem decoder 82 and sync detector 83. Sync detector 83 is connected to an output of modem decoder 82 and functions to generate a retrain request whenever the transmitter and receiver modems are out of synchronism. As mentioned previously, and shown in greater detail in FIG. 3, one embodiment of the synchronism detect function makes use of elements from the previously mentioned copending and simultaneously filed U.S. Pat. No. 4,752,943. More specifically, the index generating function of slicer decoder 4 in FIG. 3, which indicates whether an inner or outer point on the signal constellation complex plane has been received, can be incorporated into modem decoder 82. Likewise, inner and outer point detector 5 and up-/down counter 8 from FIG. 3 can be incorporated into modem decoder 82. Comparator 14 and threshold signal generator 12 can be incorporated into sync detector 83. Comparator 14 functions to output a retrain request when a preselected value which is constantly inputted to comparator 14 from threshold signal generator 12 is matched by the input to comparator 14 from up/down counter 8. It is noted that counter 8 is negatively biased in that it decrements its value by a greater amount when an outer point is detected than it increments its value when an inner point is detected.

In the operation of the aforementioned system, the signature generator 55 superimposes a phase hit (coordinate rotation) in a fixed pattern which repeats every Nth baud. The pattern is an augmented pseudorandom code which has excellent autocorrelation properties. When the transmitter and receiver modem are out of synchronism, at least half of all bauds will be received with a high phase error. Multiple signatures may use different codes or simply different magnitude phase hits.

When used to transmit and receive multiple data configurations, the present invention represents a significant advance over the prior art in that the unobtrusive signature techniques may be used to modulate the normal waveform throughout data transmission instead of just during the initial training period. For example, if the same multiplexor configuration is used to generate the signature for the transmitter and receiver modem then the coordinate transformations will cancel out with no signal degradation. But, if either transmitter or receiver is changed without the matching change occuring at the other modem then the coordinate transformation will cause sync detector 83 to generate a retrain request until the correct multiplexor configuration is selected.

The signature generator can be used for privacy to prevent gradual unauthorized entry into a network. The signature could be PROM or strap encoded. Another alternative is an external port for customer use to generate the signatures. At the transmitter a clear to send signal (CTS) can be used to initiate the signature and at the receiver a line signal detect (LSD) signal can be used for initiation.

It should be noted that the signature signal could be some type of signal other than a phase hit, such as a gain hit every N-bauds.

The above described system operates in the following fashion. During an initial training sequence or a subsequent retraining sequence synchronization is established between the transmitter and receiver modems. Loss of synchronism between the transmitter and receiver modems may cause the binary count which respectively feeds the transmitter and receiver signature generators to be out of phase with each other. This will cause the phase hits on the data signals to add instead of cancel out each other. At this time a synchronism detection function such as the above described one operates to generate a signal for a retraining request.

It should also be noted that, if the clock for the transmitter multiplexer synchronizer is in phase with the clock for the receiver multiplexer synchronizer, the generator will automatically cause the appropriate coordinate transformation on the received data signal to occur to keep the transmitter and receiver modems in synchronism. However, if the clock signals from the two multiplex synchronizers are out of phase, a loss of synchronism condition will be detected and retraining will be necessary.

Obviously numerous modifications may be made to the invention without departing from its scope as defined in the appended claims.

What is claimed is:

1. A system for continuously verifying synchronization while transmitting data signals over a communication channel comprising:
   a transmitter modem comprising means for encoding said data signals into first real and imaginary components, and a first signature generator for mixing a first obstrusive signature signal on said encoded data signals, said first unobtrutive signature signal including second real and imaginary components; and
   a receiver modem comprising means for receiving said encoded data signals from said transmitter modem, means for transforming said encoded data signals into third real and imaginary components, a second signature generator for mixing a second unobstrusive signature signal on said encoded data signals, said second unobtrusive signature signal including fourth real and imaginary components, said first and second unobtrusive signature signals being of substantially identical waveform and phase so that said first and second unobtrusive signature signals cancel each other if the transmitter and receiver modems are in synchronism;
   wherein said transmitter modem includes a first coordinate transformation module functioning to mix said second real and imaginary components of said first unobtrusive signature signal from said first signature generator on said first real and imaginary components of said encoded data signal;

wherein said receiver modem menas includes a second coordinate transformation module, a modem decoder and a sync detector module; said second coordinate transformation module functioning to mix said fourth real and imaginary components of said second unobtrusive signature signal from said second signature generator on said third real and imaginary components of said transformed encoded data signals; said modem decoder connected respectively to outputs of said second coordinate transformation module carrying said fourth real and imaginary components of said transformed encoded data signal, said modem decoder having a data output and an output connected to said sync detector, said modem detector and said sync detector having means for detecting a loss of synchronism between said transmitter modem and said receiver modem, and said sync detector having means for outputting a system retraining request if said loss of synchronism is detected.

2. The system of claim 1 wherein said first and second signature generators generate a PROM encoded signal.

3. The system of claim 1 wherein said first and second signature generators generate a strap encoded signal.

4. A system for continuously verifying synchronization while transmitting data signals over a communication channel comprising:

a transmitter modem comprising means for encoding said data signals into first real and imaginary components, and a first signature generator for mixing a first unobtrusive signature signal on said encoded data signals, said first unobtrusive signature signal including second real and imaginary components; and a receiver modem comprising means for receiving said encoded data signals from said transmitter modem, means for transforming said encoded data signals into third real and imaginary components, a second signature generator for mixing a second unobtrusive signature signal on said encoded data signals, said second unobtrusive signature signal including fourth real and imaginary components, said first and second unobtrusive signature signals being of substantially identical waveform and phase so that said first and second unobtrusive signature signals cancel each other if the transmitter and receiver modems are in synchronism;

wherein said first signature generator and said second signature generator are physically external to other elements of said transmitter modem, said receiver modem, said transmitter modem's and said receiver modem's other elements respectively having an external port which said first and second signature generators may be connected whereby a user of said system can substitute his/her signature generators for security purposes.

* * * * *

UNITED STATES PATENT AND TRADEMARK OFFICE
CERTIFICATE OF CORRECTION

PATENT NO. : 4,939,748

DATED : July 3, 1990

INVENTOR(S) : William L. Betts
Kenneth Martinez

It is certified that error appears in the above-identified patent and that said Letters Patent is hereby corrected as shown below:

Cover Page, Item [75], delete "Matinez" and substitute therefor --Martinez--.

Signed and Sealed this

Twenty-fifth Day of June, 1991

Attest:

*Attesting Officer*

HARRY F. MANBECK, JR.

*Commissioner of Patents and Trademarks*